Patented Oct. 29, 1946

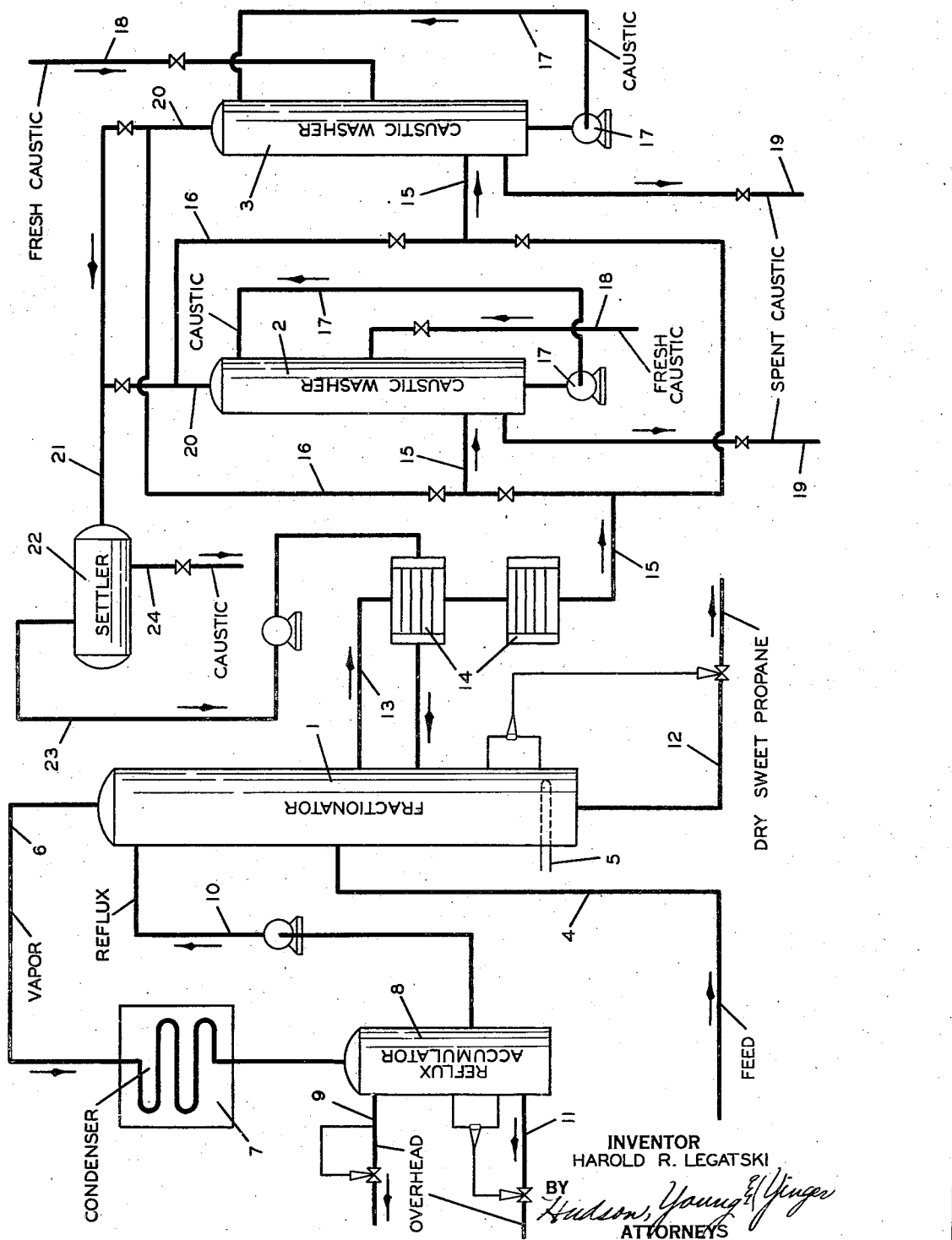

2,410,223

UNITED STATES PATENT OFFICE 2,410,223

TREATMENT OF HYDROCARBONS

Harold R. Legatski, Bartlesville, Okla., assignor to Phillips Petroleum Company, a corporation of Delaware Application March 2, 1942, Serial No. 433,063

8 Claims. (Cl. 196—5)

This invention relates to the treatment of light hydrocarbons for the removal of undesirable components and more particularly it relates to the treatment of such hydrocarbons as propane for the removal of water, and hydrogen sulfide or other undesirable and/or chemically reactive constituents.

In the charging of alkylation, polymerization and isomerization processes, it may be desirable to use as nearly pure materials as economically possible. Impurities commonly present in this type of charge stock include such undesirables as certain hydrocarbons, water or moisture and sulfur compounds, and in special cases still other compounds. For example, a butene charge stock for such processes should be essentially free of moisture, hydrogen sulfide and mercaptans and other hydrocarbons.

In one embodiment of this invention as herein fully disclosed, I am describing a method for the removal of moisture and hydrogen sulfide from a propane stock. It is known that dissolved water, hydrogen sulfide, methane and ethane may be removed from propane by fractionation. It is also known that it is generally more difficult to remove hydrogen sulfide than water or ethane to the specification limits of commercial propane purity. In other words, more fractionating plates or higher reflux ratios are required to remove hydrogen sulfide than are required to remove ethane and, in turn, ethane requires more plates or reflux than does water.

In order to produce dry hydrogen sulfide free propane from a feed stock containing methane, ethane, propane, hydrogen sulfide and dissolved water, one of the following conventional methods is ordinarily used: (1) Treat the entire feed with caustic soda solution for hydrogen sulfide removal and subsequently fractionate out the water which remains in solution in the hydrocarbon. By this method the caustic soda consumption is high, since all hydrogen sulfide must be removed by this chemical action. (2) Produce a fractionator bottoms or kettle product containing some hydrogen sulfide, then treat said bottoms with caustic solution and redehydrate the hydrogen sulfide free hydrocarbon. By this method the caustic soda consumption is low but an additional dehydration step is added. (3) By cutting more propane into the overhead product, it is possible to fractionate both water and hydrogen sulfide out of the propane kettle product but this method sacrifices propane production in order to remove hydrogen sulfide.

Bearing these conventional methods of operation in mind one object of this invention is to devise a method for separating commercially pure propane from a gaseous mixture containing methane, ethane, propane, hydrogen sulfide and dissolved water.

Another object of this invention is to provide a method for the production of commercially pure propane from a mixture containing methane, ethane, propane, water and hydrogen sulfide by a combined fractionation and chemical process.

Still another object of this invention is to provide a method for the separation of propane from a mixture containing methane, ethane, propane, water and hydrogen sulfide without having to resort to an independent dehydration step following removal of the hydrogen sulfide.

Still other objects and advantages will be apparent to those skilled in the art by a careful study of the following detailed disclosure.

Included in this specification is the figure which shows diagrammatically my apparatus and illustrates my method of producing propane free of water and hydrogen sulfide from a charge stock containing propane and lighter paraffinics, moisture and hydrogen sulfide.

In the operation of a propane fractionating and dehydrating tower I have observed that the concentration of hydrogen sulfide decreases very rapidly on the plates immediately below the feed plate and then decreases more slowly on toward the bottom of the tower. I propose to accomplish the objects of this invention and to overcome the disadvantages of the above mentioned conventional methods by devising an operation cycle based upon my observation.

Referring now to the figure, numeral 1 represents a conventional fractionator, 2 and 3 conventional caustic washing towers, and this apparatus is equipped with heat exchangers, run tanks, heaters and other auxiliary parts as explained below.

In the operation of my process charge stock containing methane, ethane, propane, hydrogen sulfide and dissolved water enter the fractionator 1 through feed line 4 at approximately the center or mid-section of the tower. This charge stock enters the said fractionator under sufficient pressure to maintain the charge in the liquid state and to carry out fractionation. Heating element 5 furnishes heat for operation of the fractionator. The tower overhead vapors pass out through line 6 and are cooled in condenser 7, the liquid condensate accumulating in reflux accumulator 8 while the uncondensed gases exit through line 9. The condensate required for refluxing passes to the tower through line 10 while that not thus required leaves the system through line 11. Line 12 conducts dry, and hydrogen sulfide free propane from the fractionator to storage, not shown.

Fractionation in tower 1 proceeds in a regular manner with most of the propane produced from the bottom of the fractionator or kettle as dry, hydrogen sulfide free propane, and the other feed components, that is, methane, ethane, water and hydrogen sulfide plus some propane are produced overhead from the fractionator. According to my invention a portion of the descending liquid is withdrawn from the tower a few trays below the feed tray at a point where the hydrogen sulfide content has been materially reduced. This withdrawn liquid passes through line 13, coolers 14, and lines 15 and into the lower portions of the caustic washer towers 2 and 3. By-pass lines 16 are provided so that either or both caustic washers may be by-passed without disrupting the operation of the fractionator.

The caustic washing towers 2 and 3 are provided with caustic circulation pumps and lines 17 for the recycling or return of partially spent caustic solution from the bottom of said contactors to the tops thereof. New caustic may be added through lines 18 while spent caustic is removed from the contactors through outlet lines 19. Caustic treated propane issues from the contactors through lines 20, passes through a common header 21 into caustic settler 22, and the caustic free propane then leaves the settler through line 23, is heated in exchanger 14 and reenters the fractionator at a point immediately below its withdrawal point. Settled caustic solution may be withdrawn from settler 22 through draw-off 24.

As mentioned above, the hydrogen sulfide containing hydrocarbon feed loses a large portion or most of its hydrogen sulfide content on the plates immediately below the fractionator feed plate, and below these plates the sulfur reduction is appreciably lessened. According to my invention I remove a portion of the propane from the fractionator at a point where most of the sulfide has already been removed by normal fractionation, cooling said withdrawn propane, treating with caustic solution for the substantially complete removal of hydrogen sulfide therefrom and pumping the sulfur free stream back into the fractionator at a point just below its withdrawal point but high enough on the column to permit complete water and hydrogen sulfide removal before the propane is drawn off from the kettle. The amount or proportion of the propane withdrawn for caustic washing is so determined that when that amount of propane free of hydrogen sulfide is reintroduced into the fractionator, the amount of H₂S remaining from the portion of propane not caustic washed may be completely removed by fractionation by the time the recombined propane reaches the draw-off of the fractionator. In addition, this operation is so adjusted that the water carried in with the charge stock and that added from the caustic washing operation are also completely removed so that only dry and hydrogen sulfide free propane may be withdrawn as bottom product.

By removing the major part of the hydrogen sulfide by fractionation and therefore only a relatively minor portion by caustic washing greatly reduces the caustic costs. And, by removing by caustic washing at least a portion of the hydrogen sulfide which is normally difficult to remove, permits operation of the fractionator at a much reduced reflux ratio, and therefore at a reduced cost of operation. My overall combined process has been found to be easy to operate and to control.

While the embodiment fully described has been directed to the removal of propane in a dry and hydrogen sulfide free condition from a mixture containing methane, ethane, propane, dissolved water and hydrogen sulfide, it is obvious that the principles involved have a wider application, and it may be concluded that the same may be applied generally to the removal of water and a chemically reactive material from a chemically unreactive material, an example of which is the production of a dry paraffinic hydrocarbon from a mixture containing water and unsaturated hydrocarbons as impurities by removing a sidestream as herein shown and treating with sulfuric acid to remove the unsaturates and returning the so treated stream to the fractionator for subsequent dehydration by fractionation.

I claim:

1. In a fractionation process for the removal of moisture and hydrogen sulfide from a low boiling fraction of impure hydrocarbons the steps comprising introducing the impure hydrocarbons into a fractionating column intermediate the ends thereof, removing overhead by fractionation moisture and a portion of the hydrogen sulfide, withdrawing at least a portion of the partially purified low boiling fraction from the fractionator at a point slightly below the impure hydrocarbon introduction point, caustic treating said withdrawn partially purified low boiling fraction for removal of the hydrogen sulfide, substantially separating said low boiling fraction from the caustic, reintroducing the caustic treated portion of the low boiling fraction into the fractionator at a point immediately below its withdrawal point and a substantial distance from the bottom of the fractionator, and completing removal of the hydrogen sulfide and moisture by continued fractionation, and removing the hydrogen sulfide free and dehydrated low boiling hydrocarbon fraction from the bottom portion of the fractionator.

2. In a fractionation process for the removal of moisture and an unsaturated hydrocarbon impurity from a low boiling paraffinic fraction of impure hydrocarbons the steps comprising introducing the impure hydrocarbons into a fractionating column intermediate the ends thereof, removing overhead by fractionation moisture and a portion of the unsaturated hydrocarbon, withdrawing at least a portion of the partially purified paraffinic low boiling fraction from the fractionator at a point slightly below the charge stock introduction point, sulfuric acid treating said withdrawn partially purified paraffinic low boiling fraction for removal of the unsaturated hydrocarbon, substantially separating said low boiling fraction from the acid, reintroducing this acid treated portion of paraffinic low boiling fraction into the fractionator at a point immediately below its withdrawal point and a substantial distance from the bottom of the fractionator, and completing removal of the unsaturated hydrocarbon and moisture by continued fractionation, and removing the purified and dehydrated low boiling paraffinic hydrocarbon fraction from the bottom portion of the fractionator.

3. In a fractionation process for the removal of moisture and a chemically reactive impurity from a low-boiling fraction of impure hydrocarbons the steps comprising introducing the impure hydrocarbons into a fractionating column intermediate the ends thereof, removing overhead by fractionation the moisture and a portion of the chemically reactive impurity, withdrawing at least a portion of the partially purified low-boiling hydrocarbon fraction from the fractionator at a point slightly below the impure hydrocarbon introduction point, treating said withdrawn partially purified low-boiling hydrocarbon fraction with a chemical non-reactive to said low-boiling hydrocarbon fraction for removal of the chemically reactive impurity, substantially separating out said chemical and reaction products, reintroducing this chemically treated portion of low boiling hydrocarbon fraction into the fractionator at a point immediately below its withdrawal point, and a substantial distance from the bottom of the fractionator and completing removal of the chemically reactive impurity and moisture by continual fractionation, and removing the purified and dehydrated hydrocarbon fraction from the bottom portion of the fractionator.

4. In a fractionation process for the removal of moisture and hydrogen sulfide from a low-boiling fraction of impure hydrocarbons the steps comprising introducing the impure hydrocarbons into a fractionating column intermediate the ends thereof, removing overhead by fractionation moisture and a portion of the hydrogen sulfide withdrawing at least a portion of the partially purified low-boiling fraction from the fractionator at a point below the impure hydrocarbon introduction point, caustic treating said withdrawn partially purified low-boiling fraction for removal of the hydrogen sulfide, substantially separating said low-boiling fraction from the caustic, reintroducing the caustic treated portion of the low-boiling fraction into the fractionator at a point below its withdrawal point and a substantial distance from the bottom of the fractionator, and completing removal of the hydrogen sulfide and moisture by continued fractionation, and removing the hydrogen sulfide free and dehydrated low-boiling hydrocarbon fraction from the bottom portion of the fractionator.

5. In a fractionation process for the removal of moisture and an unsaturated hydrocarbon impurity from a low-boiling paraffinic fraction of impure hydrocarbons the steps comprising introducing the impure hydrocarbons into a fractionating column intermediate the ends thereof, removing overhead by fractionation moisture and a portion of the unsaturated hydrocarbon, withdrawing at least a portion of the partially purified paraffinic low-boiling fraction from the fractionator at a point below the charge stock introduction point, sulfuric acid treating said withdrawn partially purified paraffinic low-boiling fraction for removal of the unsaturated hydrocarbon, substantially separating said low-boiling fraction from the acid, reintroducing this acid treated portion of paraffinic low-boiling fraction into the fractionator at a point below its withdrawal point and a substantial distance from the bottom of the fractionator, and completing removal of the unsaturated hydrocarbon and moisture by continued fractionation, and removing the purified and dehydrated low-boiling paraffinic hydrocarbon fraction from the bottom portion of the fractionator.

6. In a fractionation process for the removal of moisture and a chemically reactive impurity from a low-boiling fraction of impure hydrocarbons the steps comprising introducing the impure hydrocarbons into a fractionating column intermediate the ends thereof, removing overhead by fractionation the moisture and a portion of the chemically reactive impurity, withdrawing at least a portion of the partially purified low-boiling hydrocarbon fraction from the fractionator at a point below the impure hydrocarbon introduction point, treating said withdrawn partially purified low-boiling hydrocarbon fraction with a chemical non-reactive to said low-boiling hydrocarbon fraction for removal of the chemically reactive impurity, substantially separating out said chemical and reaction products, reintroducing this chemically treated portion of low-boiling hydrocarbon fraction into the fractionator at a point below its withdrawal point and a substantial distance from the bottom of the fractionator, and completing removal of the chemically reactive impurity and moisture by continual fractionation, and removing the purified and dehydrated hydrocarbon fraction from the bottom portion of the fractionator.

7. In a process for the fractionation of a mixture of two substances having different vapor pressures, one of said two substances being a desired hydrocarbon product, the other of said two substances being a chemically reactive impurity and said impurity being the more volatile of the two substances, the combination comprising the steps of introducing the mixture into a vertically disposed distillation column at an intermediate point, said column having an overhead vapor outlet and a bottom liquid outlet, removing overhead by fractionation at least a portion of said impurity and partially purifying the mixture thereby, withdrawing at least a portion of said partially purified mixture from the fractionator at a point between said intermediate point and the bottom outlet but relatively closer to said intermediate point, substantially separating said impurity from said partially purified mixture thereby further purifying the mixture, reintroducing said further purified mixture into the fractionator at a point intermediate said withdrawal point and the bottom outlet but adjacent said withdrawal point, completing removal of the impurity by further fractionation, and removing said desired hydrocarbon product at said bottom outlet.

8. In a process for the fractionation of a mixture of two substances having different vapor pressures, one of said two substances being a desired hydrocarbon product, the other of said two substances being a chemically reactive impurity and said impurity being the more volatile of the two substances, the combination comprising the steps of introducing the mixture into a vertically disposed distillation column at an intermediate point, said column having an overhead vapor outlet and a bottom liquid outlet, removing overhead by fractionation at least a portion of said impurity and partially purifying the mixture thereby, withdrawing at least a portion of said partially purified mixture from the fractionator at a point between said intermediate point and the bottom outlet but relatively closer to said intermediate point, contacting said withdrawn portion of the partially purified mixture with a chemical treating agent for further removal of said impurity from the mixture, separating said further purified material from the chemical treating agent and reintroducing this further purified material into the fractionator at a point intermediate said withdrawal point and the bottom outlet but adjacent said withdrawal point, completing removal of the impurity by further fractionation, and removing said desired hydrocarbon product at said bottom outlet.

HAROLD R. LEGATSKI.